United States Patent
Crockett

[11] 3,921,820
[45] Nov. 25, 1975

[54] PICKER

[75] Inventor: Robert Raymond Crockett, Westfield, Mass.

[73] Assignee: Alpha Machine & Tool Corporation, Chicopee, Mass.

[22] Filed: Mar. 4, 1974

[21] Appl. No.: 447,667

[52] U.S. Cl. .................................................. 214/1 BB
[51] Int. Cl.² ................................................. B25J 9/00
[58] Field of Search ............ 214/1 BB, 1 CM, 1 BT

[56] References Cited
UNITED STATES PATENTS

| | | | |
|---|---|---|---|
| 3,075,651 | 1/1963 | Kaden | 214/1 BB |
| 3,709,379 | 1/1973 | Kaufeldt | 214/1 BB |
| 3,760,956 | 9/1973 | Burch | 214/1 BB |

Primary Examiner—Robert J. Spar
Assistant Examiner—George F. Abraham
Attorney, Agent, or Firm—LeBlanc & Shur

[57] ABSTRACT

The picker includes an open frame carrier secured to a molding machine for linear movement along support rods in the direction of movement of one of the mold platens, i.e., a Y-axis direction, under control of a first fluid cylinder. The carrier, in turn, mounts a carriage for linear movement in a direction normal thereto, i.e., an X-axis direction, also under the control of a second fluid cylinder. Depending from the carriage is a picker arm under control of a third fluid cylinder for movement in the X-axis direction and which picker arm terminates at its inner end in a pair of jaws or fingers, the opening and closing of which are under control of a fourth cylinder. A limit switch is mounted on the mold machine for actuation when the movable mold platen obtains its open position. A pair of air switches are carried by the carrier. When the mold is fully open, the limit switch is closed by the movable platen to actuate the first air switch which, in turn, actuates the second and third cylinders for movement of the jaws along the X-axis and between the mold faces. Toward the end of the movement in the X-direction, the first cylinder is actuated to move the jaws in the Y-direction. At the end of the carriage movement, the carriage actuates an air switch which closes the jaws about the article. The carrier is then automatically retracted after a time delay in the X and Y-directions. The second air switch is then reset and opens the jaws whereby the article grasped is dropped onto a chute.

13 Claims, 3 Drawing Figures

PICKER

The present invention relates to an apparatus for retrieving articles from remote locations and more particularly relates to a picker for moving between the open mold platens in a molding machine and grasping articles, for example sprue runners, from between such mold platens.

As will be appreciated, articles, i.e., sprue runners, are very often located between the open mold platens in a molding machine. Sprue runners, particularly, can cause substantial damage to the molding machine if left between the platens. These articles can be removed manually. However, such attempts at manual removal are wrought with danger. For example, there is a very great danger of getting limbs caught between mold platens.

Prior mechanical apparatus for automatically retrieving articles from between mold platens have been proposed and constructed in the past. Many such units are complex, require a large amount of space for their operation, are time consuming and require combinations of various types of power inputs, for example electrohydraulic operation. Other types provide only for movement in one linear direction and have various ancillary problems in their construction including a lack of capability for adaptation to a variety of different sized molding machines, a tendency to wear which in turn deleteriously affects the repeatability of such machines, and generally complicated movements and operation.

The present invention provides a picker for removing articles from between the mold platens of molding machines which minimizes or eliminates the problems associated with the aforementioned and other types of article retrieval apparatus for use with molding machines and provides a novel and improved picker for use in retrieving articles from between mold platens having various advantages in construction, mode of operation and use in comparison with such prior retrieval apparatus. The present invention thus solves many of the problems and shortcomings associated with prior retrieval-type apparatus for this purpose and particularly comprises a picker which can be utilized automatically and therefore without the danger involved in manually retrieving articles from between mold platens. Furthermore, the present picker has definite repeatability in operation, is capable of moving its operating jaws in both X and Y-directions, is reliable particularly since it utilizes fluid drive systems which are simple in construction and readily controlled, and is easily adapted for use with molding machines of various sizes. More particularly, the picker hereof comprises a carrier which is mounted to the fixed platen of the molding machine for movement in the direction of the movable mold platen, i.e., in the Y-axis direction. The carrier is initially mounted such that the operating jaws carried thereby are within a predetermined distance in the Y-direction from the articles to be picked from between the mold platens. A first air cylinder is provided between the mount and the carrier for moving the carrier in the Y-direction. The carrier includes an open frame housing slidably mounting on a pair of rods a carriage for movement in a direction normal to the direction of movement of the carrier, i.e., in the X-axis direction. A second air cylinder controls the movement of the carriage. Depending from the carriage is a picker arm also under the control of a third air cylinder for movement in the X-direction. At the distal end of the picker arm there is provided a pair of pivoted jaws which open and close under the control of a fourth cylinder. With the foregoing described arrangement, the jaws are movable in the X-direction under control of the second and third cylinders and movable with the carrier in the Y-direction under control of the first cylinder. A pair of air switches are provied adjacent opposite ends of the carrier for controlling the actuation of the various cylinders in a manner set forth below.

In utilizing the picker hereof, a limit switch is secured to the molding machine adjacent the full open position of the movable platen for actuation in response to the platen obtaining its full open position. The limit switch actuates an air switch on the carrier which, in turn, supplies air simultaneously to the second and third cylinders to advance the picker jaws in the direction of the X-axis between the open mold platens of the molding machine. Toward the end of the strokes of the second and third cylinders, the air switch, through a suitable time delay valve in the air line between it and the first cylinder, actuates the first cylinder to move the carrier along the Y-axis. Movement in both X and Y-directions is provided particularly in order to preclude interference with the knockout pins on the fixed mold face should such pins remain in extended position. At the end of the strokes of the second and third cylinders, the carriage actuates the second air switch which, in turn, actuates the fourth air cylinder to close the jaws about the article to be removed from between the mold platens. The first air switch constitutes a four-way time delay valve. Consequently, after a suitable time delay, the valve shifts to actuates the first cylinder to displace the carrier along the Y-axis and and simultaneously actuate the second and third cylinders to displace the carriage along the X-axis. Upon predetermined movement of the carriage in the X-direction, the second air switch is reset which, in turn, actuates the fourth cylinder to return the jaws to a normally open position thereby dropping the article picked from between the mold platens onto a suitable chute or conveying device.

Accordingly, it is a primary object of the present invention to provide a novel and improved picker for removing articles from between the mold platens of molding machines.

It is another object of the present invention to provide a novel and improved picker for removing articles from between the mold platens of molding machines and wherein such picker provides picker jaws movable along both X and Y-axes.

It is still another object of the present invention to provide a novel and improved picker for removing articles from between the mold platens of molding machines wherein the picker is reliable and repeatable in operation, adapted for use with molding machines of various sizes, readily and easily constructed, and more reliable in operation.

It is a further object of the present invention to provide a novel and improved picker for removing articles from between the mold platens of molding machines and which picker can be operated automatically without the need for any intervening human element.

It is still a further object of the present invention to provide a novel and improved picker for retrieving articles from between the mold platens of a molding machine and which is readily adaptable for use with machines of various sizes due to the simplicity of its construction and operation.

These and further objects and advantages of the present invention will become more apparent upon reference to the following specification, appended claims and drawings wherein:

Figure 1:
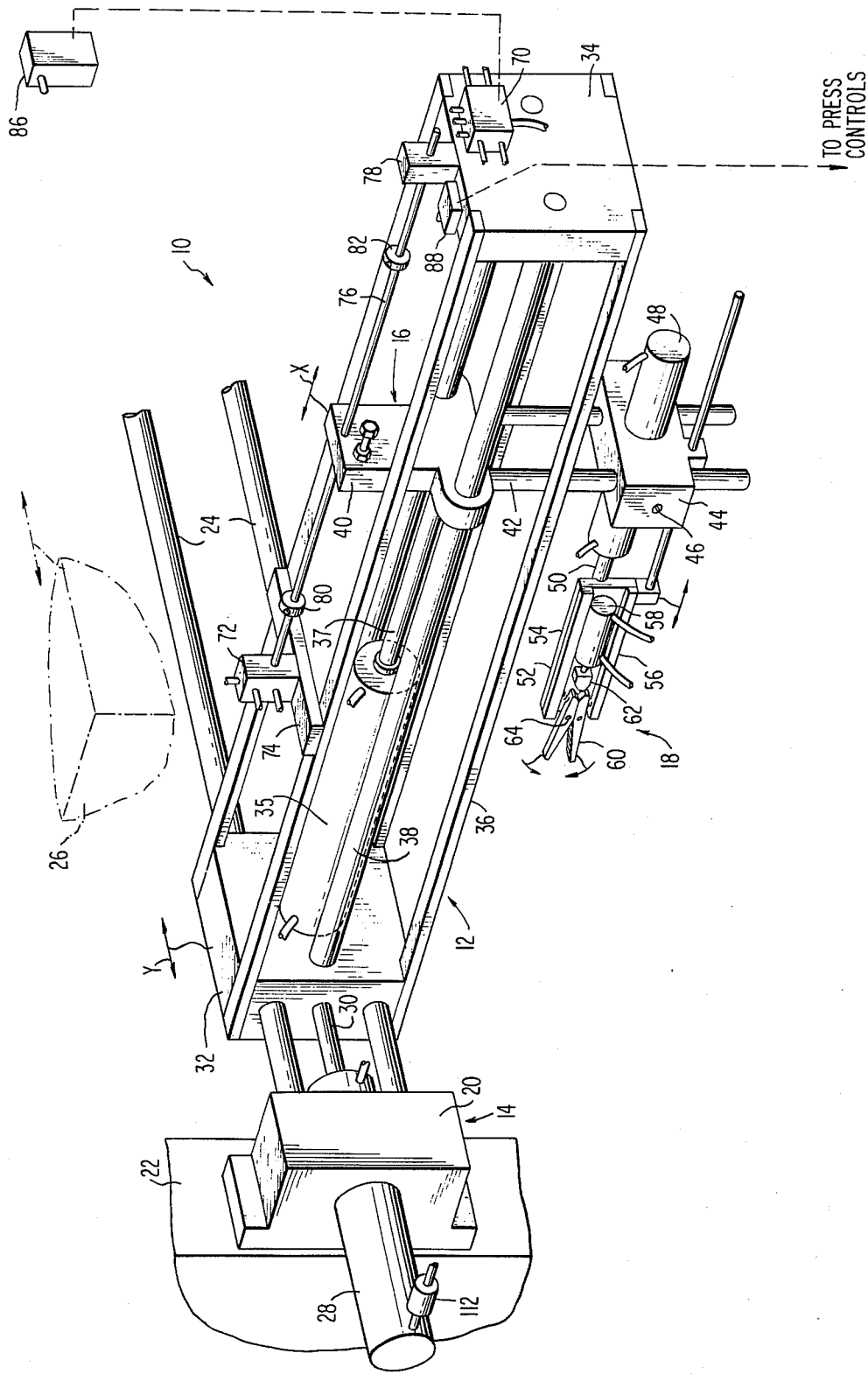
FIG. 1 is a perspective view of a picker constructed in accordance with the present invention.
Figure 2:
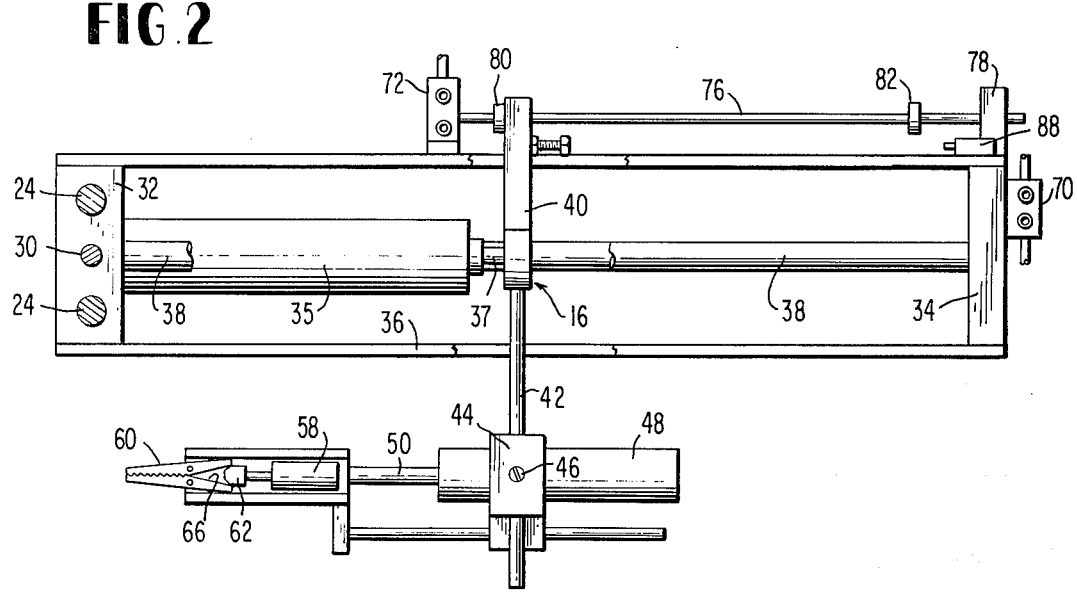
FIG. 2 is a side elevational view thereof.

Referring now to FIG. 1, there is illustrated a picker constructed in accordance with the present invention and generally designated 10 comprising a carrier generally designated 12 secured for linear sliding movement in opposite directions on a picker mounting unit generally designated 14, the carrier 12 being movable generally in opposite directions along a path parallel to the Y-axis designated by the arrows in FIG. 1. Carrier 12, in turn, mounts a carriage generally designated 16 for linear sliding movement in opposite directions along a path parallel to the X-axis also indicated by the arrows in FIG. 1. Carriage 16, in turn, mounts a gripping unit generally designated 18 for movement with the carriage 16 and carrier 12. Mounting unit 14 includes a mounting block 20 which, when the picker 10 hereof is utilized in conjunction with a molding machine, is secured preferably on one side of the fixed mold platen 22 of such machine. Block 20 carries a pair of vertically spaced guide rods 24 which, when picker 10 is secured to the molding machine, extend parallel to the direction of movement of the movable mold platen 26, it being appreciated from a review of FIG. 1 that the movable mold platen 26 of the molding machine moves linearly in opposite directions along a path parallel to the Y-axis. Accordingly, picker 10 is preferably mounted along one side of the molding machine with the gripping unit 18 carried for movement along paths parallel to the X and y axes whereby the gripping unit 18 is receivable between mold platens 22 and 26 when the mold platens are open and retractable therefrom when closed in the manner described below. The mounting block 20 also carries a fluid, preferably pneumatically, actuated cylinder 28, the piston rod 30 of cylinder 28 being secured to an end plate 32 of the carrier unit 12. Carrier unit 12 is supported by end plate 32, which, in turn, is bored to receive guide rods 24, whereby carrier unit 12 is slidably mounted for movement in the Y-direction along and supported from guide rods 24. Accordingly, it will be appreciated that extension and retraction of piston 30 of cylinder 28 linearly slidably moves carrier 12 along guide rods 24 in opposite directions along a path parallel to the Y-axis.

Carrier 12 is comprised of an elongated open frame housing having plates 32 and 34 at opposite ends with support bars or stringers 36 extending longitudinally in the X direction between the end plates. Also extending between end plates 32 and 34 are a pair of longitudinally spaced guide rods 38. Carriage 16 includes an upper generally inverted T-shaped mounting element 40 which is suitably bored along its lower flanges to receive guide rods 38 whereby carriage 16 is mounted for linear sliding movement in the X-direction relative to carrier 12. Also secured to end plate 32 is a fluid, preferably pneumatically, actuated cylinder whose piston rod 37 is secured to element 40. Accordingly, extension and retraction of piston rod 37 from cylinder 35 displaces element 40 and the gripping unit 18 carried thereby in a manner described below linearly along guide rods 38 in the X-direction.

Depending from element 40 is a pair of vertically extending laterally spaced guide rods 42, the rods 42 extending below carrier 12 between the lower pair of stringers 36. A mounting block 44 for gripping unit 18 is received on the depending guide rods 42 and is secured in an adjustable elevation along rods 42 and relative to carrier 12 for example by set screws 46. Block 44 carries a fluid, preferably pneumatic, actuated cylinder 48, the piston rod 50 of which is secured to gripping unit 18. With the arrangement previously described, it will be appreciated that actuation of cylinder 48 to extend or retract piston rod 50 extends and retracts the gripping unit 18 in the X-direction respectively between the open mold faces 22 and 26 and to one side thereof.

The gripping unit 18 includes a housing 52 having a side plate 54 to which piston rod 50 is coupled and a pair of upper and lower bars 56 defining a recess in which a fluid, preferably pneumatically actuated cylinder 58 and gripping fingers 60 of gripping unit 18 are disposed. The piston rod of cylinder 58 carries a wedge 62. The fingers 60 are pivoted intermediate their ends, about axes 64 and have cam surfaces 66 inwardly of their pivotal axes 64 which bear against the respective opposite sides of wedge 62. A spring, not shown, normally biases the fingers for pivotal movement in a direction such that the fingers are normally open as illustrated in FIG. 1, and hence such that the cam surfaces 66 lie in following engagement with wedge 62. The inner faces of fingers 60 adjacent their outer ends are serrated to provide a gripping surface. It will be appreciated that extension and retraction of the piston rod of cylinder 58 causes fingers 60 to respectively move from their normally open position to a closed position and from the closed position to their normally opened position under the bias of the spring.

Figure 3:
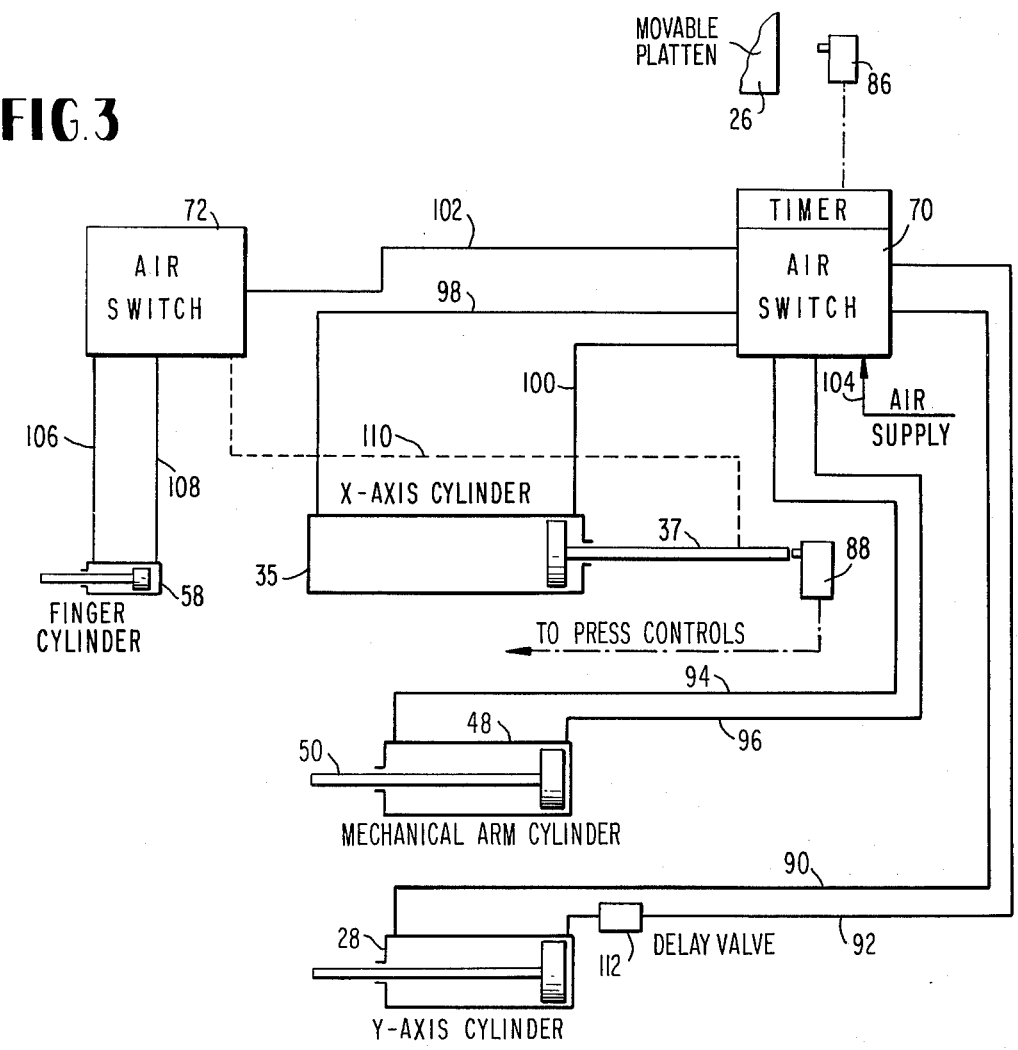
FIG. 3 is a schematic illustration of a contol system for the picker.

A control system is provide for coordinating the various movements afforded by the cylinders in a manner such that gripping unit 18 can move to a location between the mold platens when the mold platens are opened, grip the article to be moved, and withdraw with the article from between the mold platens and deposit the article at a designated location. To accomplish the foregoing, there is provided a timer controlled air switch 70 which is mounted on end plate 34. Air switch 70 may comprise a five-port, four-way, solenoid actuated spool-type valve, for example the Air Pal Valve 384–2001–1 manufactured by the Becket-Harcum Co. There is also provided a second air switch 72 which is mounted on a cross brace 74 across the upper pair of stringers 36 a suitable distance from the end plate 34 as described hereinbelow. Air switch 72 may comprise a push-pull valve, for example a Hennels 25 7/16 four-way valve. A rod 76 serves as an actuating device for switch 72 and extends between switch 72 and a mounting block 78 on end plate 34. Rod 76 carries a pair of spaced stops 80 and 82 which are adjustably positioned along rod 76 by set screws. A limit switch 86 is provided for actuating valve 70 in response to movement of the movable platen 26 into its full open position. A second limit switch 88 is carried on top of end plate 34 and is actuated in response to return of carriage 16 and the gripping unit 18 to fully retracted positions on one side of the mold platens. Switch 88 is coupled to the control circuit for the molding machine and serves to disable the molding machine when the switch is actuated by the carriage to preclude operation of the molding machine while the gripping unit 18 lies between the mold platens. As illustrated in FIG. 3, a pair of air lines 90 and 92 interconnect switch 70 and cylinder 28. Similarly, pairs of air lines 94, 96 and 98, 100 interconnect air switch 70 and cylinders 48 and 35, respectively. An air supply line 102 interconnects air switches 70 and 72, air being provided air switch 70 from a suitable source, not shown, by supply line 104. A pair of air lines 106 and 108 communicate between air switch 72 and finger actuating cylinder 58. The dashed line 110 in FIG. 3 represents the mechanical actuation of air switch 72 by extension and retraction of rod 37 of cylinder 35.

In operation, the movable mold platen of the molding machine, under the control of a control circuit, not shown, for the molding machine, is moved to a full open position and actuates limit switch 86. Actuation of limit switch 86 in turn actuates air switch 70 whereupon air is supplied via lines 100 and 96 to cylinders 35 and 48, respectively, to move the gripping unit 18 in the X-direction relative to carriage 16 and also by movement of carriage 16 along carrier 12. Air is also supplied cylinder 28 via line 92 but only after a time delay caused by a delay valve 112 in line 92. The delay is such that cylinder 28 is actuated to shift carrier 12 along a path parallel to the Y-axis shortly before the completion of the strokes of cylinders 35 and 49 along the X-axis. Thus, the open fingers 60 of gripping unit 18 are first moved linearly along a path parallel to the X-axis between the open mold platens and then moved along the arc of a curve by simultaneous operation of cylinders 28, 48 and 35 into a position about the article to be retrieved. At the completion of the stroke of air cylinder 35, element 40 engages stop 80 on rod 76 to actuate air switch 72. Actuation of switch 72 supplies air via line 108 to cylinder 58 whereby wedge 62 is extended to cam fingers 60 into a closed position about the article to be retrieved and against the bias of the spring, not shown, normally holding the fingers in an open position. Upon expiration of a predetermined interval of time after initial actuation of cylinders 48 and 35, afforded by the timer, the air switch 70 shifts to provide air to cylinders 48, 35 and 28 via lines 94, 98 and 90, respectively, to simultaneously displace gripping unit 18 and the article gripped thereby in the X and Y-directions, thereby retracting unit 18 and the article from between the open mold platens toward one side thereof. Toward completion of the stroke of piston rod 37 of cylinder 35, element 40 of carriage 16 engages the second stop 82 on rod 76 which, in turn, returns air switch 72 to its original position whereby air is supplied via line 106 to cylinder 58 to retract wedge 62. Accordingly, the spring, not shown, biases fingers 60 into an open position and the article retrieved from between the mold platens is dropped from the gripping unit 18 at a predetermined location along the path of movement of the gripping unit in the X-direction. Upon completion of the stroke, block 40 engages and actuates limit switch 88 which, in turn, enables the control circuit for the molding machine to again cycle the machine for an additional molding operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A picker comprising a mounting unit, a carrier carried by said mounting unit for linear movement along a first predetermined linearly extending path, a first fluid actuated cylinder for moving said carrier in opposite directions along said predetermined path, a gripping unit carried by said carrier for movement with said carrier along said first predetermined path and for linear movement along a second predetermined linearly extending path substantially normal to said first predetermined path, a second fluid actuated cylinder for moving said gripping unit in opposite directions along said second predetermined path, said gripping unit including a pair of gripping elements movable between open and closed positions, means carried by said gripping unit for moving said elements between said open and closed positions, a carriage slidably carried by said carrier for linear movement along a path parallel to said second predetermined path, means coupling said gripping unit to said carriage for movement therewith, said second fluid actuated cylinder being carried by said carrier for moving said carriage and the gripping unit carried thereby in opposite directions along said parallel path, a third fluid actuated cylinder carried by said carriage for movement therewith and coupled between said gripping unit and said carriage to provide for movement of said gripping unit relative to said carriage.

2. A picker according to claim 1 wherein said gripping element moving means includes fluid actuated means responsive to substantial completion of movement of said gripping unit in one direction along said second path for moving said gripping elements toward their closed position.

3. A picker according to claim 2 wherein said gripping element moving means is responsive to movement of said gripping unit in the opposite direction along said second path for moving said gripping elements toward said open position.

4. A picker according to claim 1 wherein said first and second cylinders are operable to move said gripping unit in one direction respectively along each of said first and second predetermined paths, control means for actuating said first cylinder in timed sequence after actuation of said second cylinder whereby said gripping unit is moved in one direction along said first predetermined path after said gripping unit is moved in one direction along said second predetermined path.

5. A picker according to claim 4 wherein said first and second cylinders are operable to move said gripping unit in an opposite direction respectively along each of said first and second predetermined paths, control means responsive to substantial completion of movement of said gripping unit in one direction along said second path for moving said gripping elements toward their closed positions, said control means being responsive to movement of said gripping unit in the opposite direction along said second path to enable said gripping elements to move toward their open position.

6. A picker according to claim 1 wherein said carrier is comprised of an elongated open frame housing having a pair of guide rods extending between its opposite ends, said carriage being carried by said guide rods for slidable movement therealong.

7. A picker according to claim 6 wherein said carriage has a pair of guide rods projecting therefrom through a side of said open frame housing, said gripping unit being carried by the latter guide rods at selected positions therealong, and means for securing said gripping unit to the latter guide rods in a selected position therealong.

8. A picker according to claim 1 wherein said mounting unit includes a pair of spaced parallel guide rods extending in a direction parallel to said first path, said carrier being mounted for sliding movement along said guide rods, said first cylinder being coupled between said mounting unit and said carrier for moving said carrier along said first path.

9. A picker according to claim 8 wherein said carrier is comprised of an elongated open frame housing having a pair of guide rods extending between its opposite ends, a carriage slidably carried on the second mentioned guide rods for linear movement along a path parallel to said second predetermined path, means coupling said gripping unit to said carriage for movement therewith, a third fluid actuated cylinder carried by said carriage for moving said gripping unit carried thereby in opposite directions along said parallel path, said second cylinder being carried by said carrier and coupled between said carrier and said carriage to provide for movement of said gripping unit relative to said carrier, said carrier being mounted on the first mentioned guide rods at one end thereof with said carrier projecting outwardly from and substantially normally disposed relative to the first mentioned guide rods.

10. A picker according to claim 9 wherein said carriage has a pair of guide rods projecting therefrom through a side of said open frame housing, said gripping unit being carried by the latter guide rods at selected positions therealong, and means for securing said gripping unit to the latter guide rods in a selected position therealong.

11. A picker according to claim 1 wherein said first and second cylinders are operable to move said gripping unit in one direction respectively along each of said first and second predetermined paths, and control means coupled to said first and second cylinders providing for simultaneous actuation thereof at least for a portion of the movement of said gripping unit in the one direction along each of said first and second predetermined paths whereby said gripping unit is movable simultaneously in directions parallel to said first and second paths.

12. A picker comprising a mounting unit, a carrier carried by said mounting unit for linear movement along a first predetermined linearly extending path, a first fluid actuated cylinder for moving said carrier in opposite directions along said predetermined path, a gripping unit carried by said carrier for movement with said carrier along said first predetermined path and for linear movement along a second predetermined linearly extending path substantially normal to said first predetermined path, a second fluid actuated cylinder for moving said gripping unit in opposite directions along said second predetermined path, said gripping unit including a pair of gripping elements movable between open and closed positions, means carried by said gripping unit for moving said elements between said open and closed positions, said mounting unit including a pair of spaced parallel guide rods extending in a direction parallel to said first path, said carrier being mounted for sliding movement along said guide rods, said first cyldinder being coupled between said mounting unit and said carrier for moving said carrier along said first path, said carrier being comprised of an elongated open frame housing having a pair of guide rods extending between its opposite ends, a carriage slidably carried on the second mentioned guide rods for linear movement along a path parallel to said second predetermined path, means coupling said gripping unit to said carriage for movement therewith, a third fluid actuated cylinder carried by said carriage for moving said gripping unit carried thereby in opposite directions along said parallel path, said second cylinder being carried by said carrier and coupled between said carrier and said carriage to provide for movement of said gripping unit relative to said carrier, said carrier being mounted on the first mentioned guide rods at one end thereof with said carrier projecting outwardly from and substantially normally disposed relative to the first mentioned guide rods.

13. A picker according to claim 12 wherein said carriage has a pair of guide rods projecting therefrom through a side of said open frame housing, said gripping unit being carried by the latter guide rods at selected positions therealong, and means for securing said gripping unit to the latter guide rods in a selected position therealong.

* * * * *